(12) United States Patent
Nicolas et al.

(10) Patent No.: US 8,197,315 B2
(45) Date of Patent: Jun. 12, 2012

(54) DEVICE FOR INTERACTIVE PRACTICE OF SOCCER USING A JOYSTICK COMPRISING A COUPLE OF CONTROL UNITS

(75) Inventors: Frédéric Nicolas, Morêt-sur-loing (FR); Frédéric Claudel, Paris (FR)

(73) Assignee: Bigben Interactive, Lesquin (FR)

(*) Notice: Subject to any disclaimer, the term of this patent is extended or adjusted under 35 U.S.C. 154(b) by 136 days.

(21) Appl. No.: 12/598,737

(22) PCT Filed: May 5, 2008

(86) PCT No.: PCT/FR2008/000629
§ 371 (c)(1),
(2), (4) Date: Aug. 3, 2010

(87) PCT Pub. No.: WO2008/152230
PCT Pub. Date: Dec. 18, 2008

(65) Prior Publication Data
US 2010/0304867 A1     Dec. 2, 2010

(30) Foreign Application Priority Data
May 4, 2007   (FR) ...................................... 07 03227

(51) Int. Cl.
*A63F 13/00* (2006.01)
(52) U.S. Cl. ............................................ 463/4; 463/46
(58) Field of Classification Search ................. 463/4, 46
See application file for complete search history.

(56) References Cited

U.S. PATENT DOCUMENTS
5,280,922 A   1/1994   Jones

FOREIGN PATENT DOCUMENTS
WO   2007/045765   4/2007

OTHER PUBLICATIONS

HTTP://WWW.PRIMETIMEAMUSEMENTS.COM: "Kick it Jr." [Magnetic Tape] 1997, Global VR, XP002504836, Retrieved from the Internet: URL:http://www.primetimeamusements.com/arcadegame.php?id=31> [retrieved on Nov. 19, 2008].
-& WWW.GAMEFAQS.COM: "Kick it Jr." [Online] 1997, Global VR, XP0002504837, Retrieved from the Internet: URL:http://www.gamfaqs.com/coinop/arcade/data/568048.html> [retrieved on Nov. 19, 2008].

*Primary Examiner* — Peter DungBa Vo
*Assistant Examiner* — Jeffrey Wong
(74) *Attorney, Agent, or Firm* — Harness, Dickey & Pierce, P.L.C.

(57) ABSTRACT

The present disclosure relates to a device for the virtual and interactive practicing of soccer, complementing the joysticks comprising a pair of control units, comprising an attachment system joining one of the control units to a balloon in which the player can stamp his foot and a connection system interlinking the two control units over a distance that can be greater than the length of their connecting lead.

8 Claims, 4 Drawing Sheets

DEVICE FOR INTERACTIVE PRACTICE OF SOCCER USING A JOYSTICK COMPRISING A COUPLE OF CONTROL UNITS

CROSS-REFERENCE TO RELATED APPLICATIONS

This application is a National Stage Entry of International Application No. PCT/FR2008/000629, filed on May 5, 2008, which claims priority to French Application 0703227, filed on May 4, 2007, both of which are incorporated by reference herein.

BACKGROUND AND SUMMARY

The present invention relates to the field of devices for virtual games, and more particularly to a device for the virtual and interactive practice of the football sport activity (also known by the name "soccer").

The principal aim of the invention is to allow novel interactive practice of football video games, by the novel interactions made possible by the device according to the invention when used as a complement to a joystick, such as that described in patent US2007072680 (NINTENDO-2007). The joystick described in said patent US2007072680 is constituted by a couple of control units, in said patent called first control unit/command ("first control unit") and second control unit/command ("second control unit").

The football video games are generally complex and generally characterised by player control of:

virtual football players taken one by one successively within a team, moves made by said football players by means of specific directional buttons, choice of a type of ball strike, generally including four broad categories of strike, "short pass", "forward pass", "long pass" and "shot", the intensity of the strike characterised by the time during which the signal triggering the strike is sent (that is, in the case of a joystick, the time during which the button triggering the strike is kept pressed), taking into account the direction of the strike generally by means of a directional button, and a certain number of other commands triggering variations in running, feints, dribbles, changes in team strategies, etc.

The prior art already knows video game peripherals attempting to increase game and sport interactions for greater realism of the practice of virtual activities, including the practice of football video games. There has been obvious development in accessories such as joysticks comprising the couple of control units mentioned earlier. It is important to describe this couple of control units in order to comprise the interest of the device according to the invention. The first control unit is fitted especially with buttons, to be pressed by fingers, and sensors sensitive to the accelerations to which the first control unit is subjected. As for the first control unit, the second control unit comprises buttons, although fewer in number, as well as sensors sensitive to accelerations. Use of the first control unit and of the second control unit therefore comprises pressure actions with the fingers on buttons, relatively common to game joysticks, as well as more-original actions such as accelerations to which one and/or the other of the control units is subjected.

The state of the control elements of the first control unit and the state of the control elements of the second control unit are transmitted to a radio-frequency receiver connected to or integrated into a numerical processing unit, especially of game console type, via a radio-frequency transmitter located in the first control unit. The second control unit has no radio-frequency transmitter. The second control unit is utilised coupled with the first control unit to which it connects via a specific connection cord of a length of around one metre. Particularly by using signals originating from their sensors sensitive to accelerations, the first and second control units interact with video games by more or less vigorously moving said control units and therefore by having physical activity which can be close to that appearing virtually in the video game.

It is important to note that the physical activity characteristic of football games, specifically foot strikes on a ball, is not immediately transposable to the first control unit or to the second control unit, due to the fact that these control units have been designed to be hand-held. On the other hand, use of the hand to control at least one of these two control units, and therefore the generation of numerous signals by means of the numerous buttons on these control units remains indispensable due to the multiplicity of actions of football video games other than ball strikes. Throughout the document we will use the terms "first control unit" and "second control unit" to designate the couple of control units described in patent US2007072680 indicated hereinabove and all couples of control units having similar characteristics.

There are accessories, complementary to the first control unit, whereof the object is to heighten the gaming sensations of the user by a first control unit, most often, and sometimes by a first control unit and a second control unit. Such accessories are characterised in that they are fitted with a part where a first control unit can be embedded, inserted or attached, where they are fitted with any command element and where the game signals are generated solely by actioning the control elements of the first control unit. Such accessories comprise few or no electronic components, resulting in limited production costs.

For example, one of these accessories is like a small plastic tennis racquet having at the level of the sleeve a location for attaching the first control unit. By using this accessory as a complement to the first control unit for playing tennis video games, a user triggers the signals of the first control unit, and in particular the signals generated by the sensors sensitive to the accelerations of the first control unit, by flailing the air with an object resembling a racquet and therefore also having the impression of practicing an activity similar to tennis. It is important to note that the accessory complementary to the first control unit does not by itself trigger any signal to the game and that said game signals could be generated merely by using the first control unit. In the same way there are accessories complementary for golf, automobile racing, etc., but to this day, none of the existing accessories complementary to the first control unit permits the practice of football as proposed by the device according to the invention. Also, the device according to the invention addresses the combined actions of hands and feet, whereas existing accessories address only the hand actions of the user.

The patent FR0510780 (2005-XKPAD) describes an accessory for interactive practice of football games. This accessory was not designed to be used as a complement to other joysticks, but for generating for itself all the signals of football video games. It comprises a large number of electronic components. Its production cost is therefore excessively higher than expected for an accessory complementary to a couple of control units. On the other hand, this accessory has no element for hooking, embedding, attaching or connecting a first control unit or a second control unit.

The aim of the present invention is to rectify the gaps of the prior art by original association of five elements:
- a ball elastically connected to a plinth,
- an attachment system, integral with the ball and bearing a control unit of second control unit or first control unit type; said control unit can be introduced, gripped, embedded or attached and consequently can be made integral with the movements of said attachment system and therefore of said ball,
- a connecting system for interconnecting the first control unit and the second control unit over a length greater than that of the cord of the second control unit,
- a mat attached to said plinth.

The device according to the invention makes for virtual and interactive practice of football by means of control units and football video games. In particular, such video games can use a virtual ball strike to translate a real strike of the ball by the user, given the signals coming from the sensors sensitive to acceleration of the control unit made integral with the movements of the ball. On the other hand, football game actions, such as dribbling or defensive pressing, could be triggered by pressing with the foot on the ball to incline the control unit integral with movements of the ball, which will specifically activate its sensors sensitive to acceleration (in this case, by variation of the acceleration of terrestrial gravity such as captured along their axis). Finally, by means of the connecting system of the device according to the invention a first control unit or a second control unit could be integral with the ball of the device according to the invention while being connected to the other control unit, the second control unit or the first control unit, which could be held between the hands of the user for sending game signals other than kicks, dribbles or defensive pressing by pressure on its buttons.

The device according to the invention comprises a ball. According to a preferred embodiment, this ball has dimensions close to those of a football. According to an embodiment, this ball is a ball made of foam. According to an embodiment with a ball made of foam, the outer covering of the ball is hard plastic to give the ball a sufficient resistance to kicks. According to an embodiment with a ball made of foam, the attachment system is inside the ball. According to this embodiment, the attachment system can be taken out or replaced inside the ball by the user, especially when the first control unit or the second control unit is attached thereto.

According to a preferred embodiment, the ball is a ball inflated with air. According to this preferred embodiment, the attachment system is fixed on the outer surface of the ball, to the side opposite the surface presented with kicks by the user. On the other hand, the attachment system is at sufficient distance from the top of the ball so as not to be crushed by the foot of the player in the event where the latter presses down on the ball with his foot.

According to an embodiment, the outer surface of the ball has a hollow imprint having the form of one of the control units forming the attachment system. The ball of the device according to the invention is fixed elastically to a plinth. According to a preferred embodiment, the method of fixing the ball to the plinth is carried out by means of a cylindrical extension of the base of the ball in the plinth and fixed to the plinth by means of a split pin. According to a preferred embodiment, the underside of the plinth can be disassembled, allowing the split pin to be removed and therefore the ball to be changed if damaged. According to a preferred embodiment, the plinth has a pyramidal compressed shape giving good stability to the plinth and therefore to the ball, at the same time reducing the risk of the user accidentally striking the edge of the plinth when attempting to strike the ball.

The device according to the invention comprises an "attachment system" integral with movements of the ball in which a first control unit or a second control unit can be introduced, attached or embedded, to become integral with movements of the attachment system and therefore movements of the ball. The sensors sensitive to acceleration of the control unit therefore made integral with the ball by the attachment system will be activated by accelerations undergone by the ball when kicked. According to an embodiment, the attachment system is a box whereof the interior made of foam is hollow with an imprint of a control unit. Once this box is closed, the control unit is immobilised inside because of the imprint. This box has an opening for the connecting system of the device according to the invention or the cord of the control unit.

According to an embodiment, the attachment system comprises two clamps made of plastic kept in place by the pressure exerted on the control unit gripped between them. According to an embodiment, the attachment system is constituted by a sheath in which a control unit can be slid. According to an embodiment, elastic bands closed by means of Velcro or a loop can be folded down from one side to the other of the attachment system to reinforce attachment of the control unit to the attachment system.

According to a preferred embodiment, the attachment system is designed according to the dimensions of the second control unit. The first control unit, which is the control unit having more buttons of the two, is in the hands of the user who could now activate football game signals others than ball strike, dribbling or defensive pressing. According to a preferred embodiment, the attachment system is designed to hold the second control unit on the surface of the ball, such that the cord of said control unit is directed towards the plinth of the ball.

According to a preferred embodiment, the attachment system is fixed such that the axes of the sensors sensitive to acceleration of the second control unit are placed such that one is vertical. Using this sensor as an inclinometer it will then be possible to know the degree of inclination of the attachment system and therefore of the ball. This information could for example be utilised to generate defensive pressing or dribbling signals from the moment when the time of inclination of the ball will be greater than the time of inclination normally generated by a strike.

According to a preferred embodiment, the attachment system is fixed such that the axes of the sensors sensitive to the acceleration of the second control unit are places such that two of these axes are in a horizontal plane. The values of the sensors will give the components on said axes "acceleration" vectors to which the second control unit, and therefore the ball, will be subjected due to their integralarity with movements, especially due to foot strikes on the ball. It will thus be possible to define the angle of ball strike by studying the components of the acceleration vector. This angle of strike could be used to distinguish between the different types of shots and passes in the game. Strikes on the side of the ball could for example be distinguished from strikes on the front of the ball. On the other hand, the vectorial module of the acceleration due to a real strike by the player on the ball, a module calculated as being the square root of the sum of the square of the values of sensors sensitive to acceleration of the second control unit, could be transposed to the game, for example in emission time of the signal of the determined strike, to define the intensity of said shot or of said strike in the game.

According to an embodiment, the attachment system is made integral with the outer surface of the ball by adhesion.

According to an embodiment, the attachment system is made integral with the outer surface of the ball by thermo-welding. According to an embodiment, the attachment system is made integral with the outer surface of the ball by a band encircling the ball and passing through yokes made on either side of the attachment system.

A connecting system connects the control units over a distance greater than the length of the cord of the second control unit. According to a preferred embodiment, an outlet in which the connector located at the end of the cord of the second control unit can be connected is situated on the plinth. This outlet is connected to a cable passing through the plinth then inside the mat, and finally exiting from said mat, to the side. The other end of this cable is constituted by a connector for connecting to the outlet situated on the first control unit. The length of this cable is such that a user can stand upright in front of the ball of the device according to the invention, at a distance allowing him to kick the ball, while holding the first control unit connected to the cable.

According to this preferred mode, the part of the cable in the mat runs to the periphery of the mat, so as not to be located under the zones of the mat on which the user is most likely to stand, so as to decrease crushing of said cable by the user. According to this preferred mode, the cable exits from the mat to the right of the user when the latter faces the ball, such that when the user holds the first control unit such that the outlet of the first control unit is directed to his right, said cable is not in the trajectory paths of the kicks of the user. Holding the first control unit in this way allows the user to have the directional button of the first control unit at his left, which could be used to direct the players and indicate the directions of the balls, as in traditional use of a directional button in classic game joysticks in a football video game. This connecting system interconnects the two control units, even if the distance between the second control unit and the first control unit is greater than the length of the cord of the second control unit, and detaches the movements of the second control unit connected to the ball, movements of the cable connecting the first control unit to eliminate tensions resulting from contrary movements at the level of the connectors.

The signals generated by the second control unit, for example due to ball strikes, can therefore be sent to the digital processing unit, or the games console, via the first control unit. This is also the case of signals from the first control unit and combinations of signals from the first control unit and the second control unit. This device therefore generates a large number of signals which can be used to generate the numerous signals of football video games. For example, the combination of pressure on a button of the first control unit and a ball strike could generate certain types of signals according to the angle of strike ("long pass" or "shot"), whereas in the absence of pressure on the button of the first control unit the same strike could generate other types of signals according to the angle of strike ("short pass" or "forward pass").

The device according to the invention comprises a mat attached to the plinth. According to a preferred embodiment, this mat is presented to the side of the ball subjected to kicks by the user, and a surface such that said user has his supporting foot on the mat when he strikes the ball.

BRIEF DESCRIPTION OF DRAWINGS

The invention will be better understood from the following description given purely by way of explanation of an embodiment of the invention, in reference to the attached figures.

DETAILED DESCRIPTION

Figure 1:
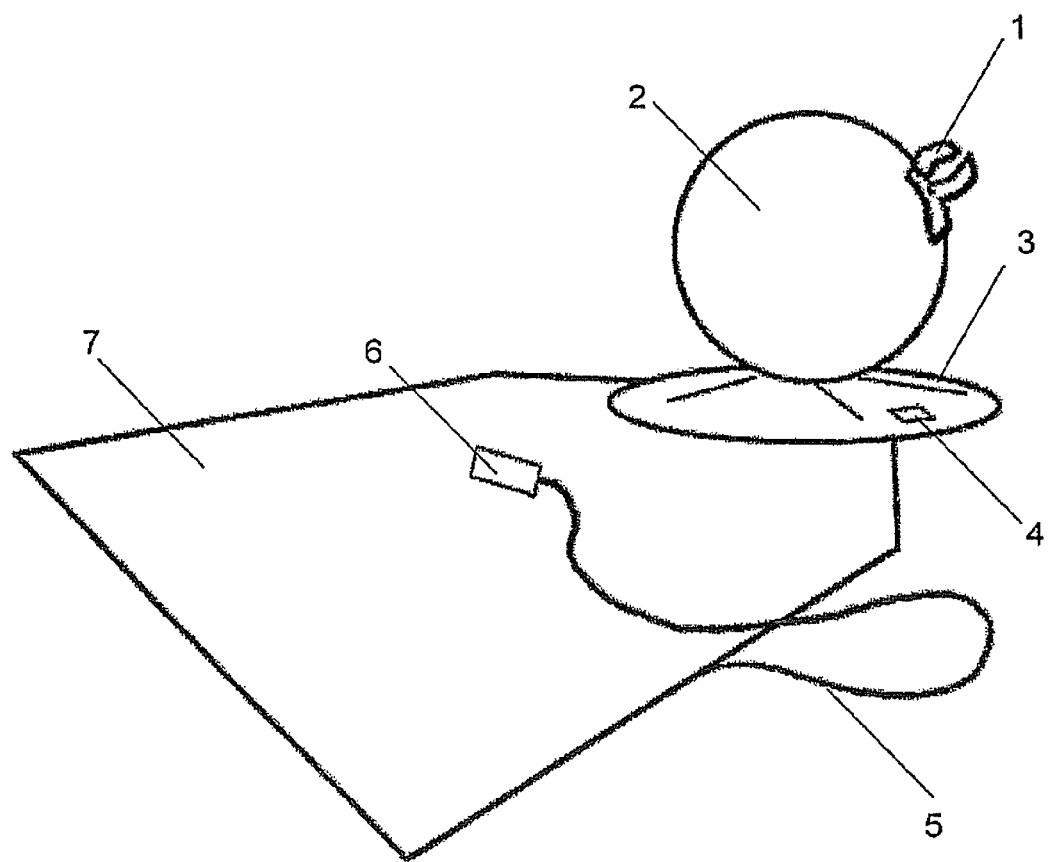
FIG. 1 illustrates the device according to the invention in its entirety without the control units.

According to an embodiment illustrated in FIG. 1, an attachment system 1 serving to keep a second control unit in place is stuck to the surface of a ball 2. This ball 2 is elastically connected to a plinth 3 equipped with an outlet 4 intended to receive the connector of the cord of the second control unit. This outlet 4 is connected to the cable 5 whereof the end 6 is a connector designed to enter the outlet of the first control unit. A mat 7, attached to the plinth 2, is on the opposite side, relative to the ball 2, the attachment system 1 and therefore the second control unit.

Figure 2:
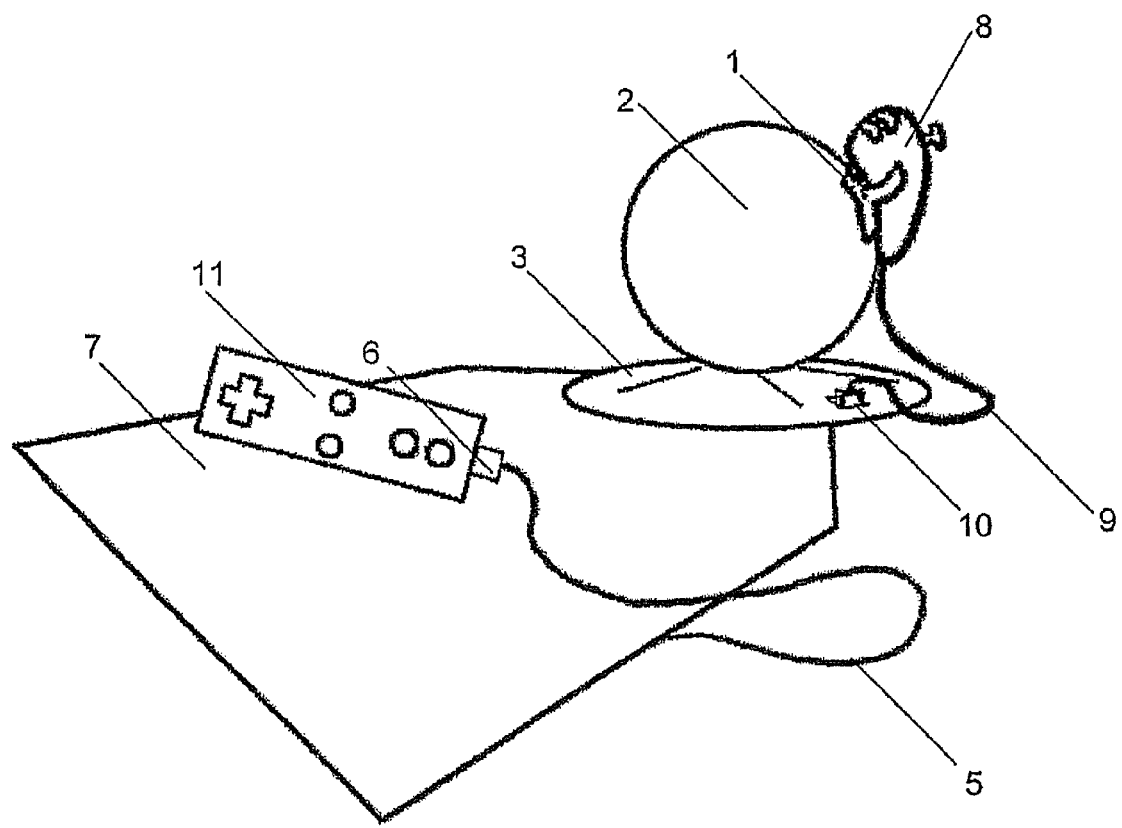
FIG. 2 illustrates the device according to the invention in its entirety with the first and second control units.

In FIG. 2, the second control unit 8 is embedded in the attachment system 1 stuck to the ball 2. The cord 9 of said second control unit 8 is connected by its end 10 to the outlet located in the plinth 3. The signals emitted by the second control unit 8 are sent via the cable 5 and the connector 6 to the first control unit 11.

Figure 3:
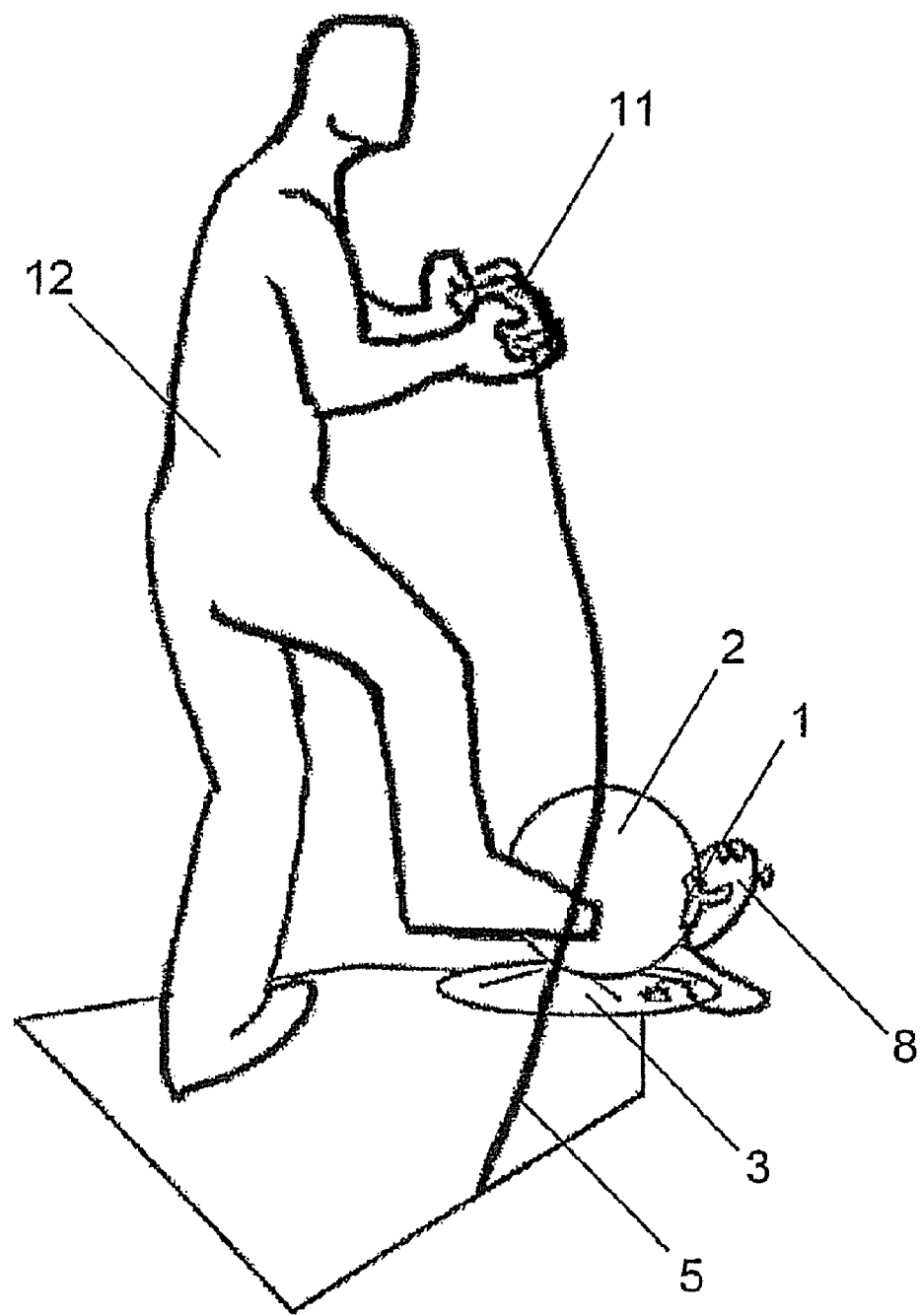
FIG. 3 illustrates the device according to the invention with one user.

In FIG. 3, a user 12 holds the first control unit/command 11, the buttons of which are activated by the fingers. This user kicks the ball 2, moving the attachment system 1, attached thereto, and therefore the second control unit/command 8.

Figure 4:
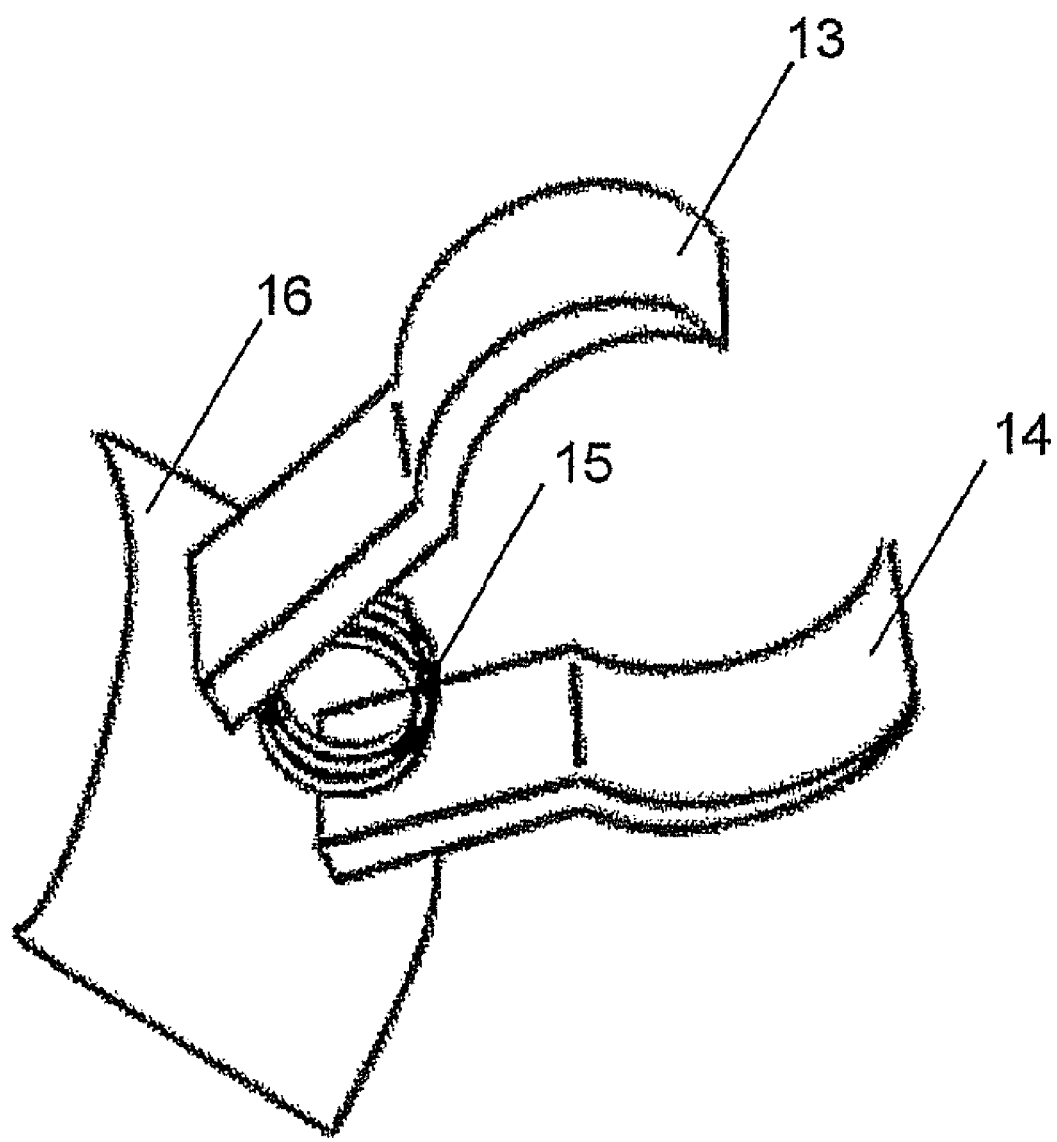
FIG. 4 illustrates an attachment system.

FIG. 4 illustrates more precisely an attachment system. It is constituted by clamps 13 and 14, the closing of which is controlled by a spring 15, according to the principle of closing spring hinges. The form of the clamps 13 and 14 is adapted to the form of a second control unit. At rest, the opening of the clamps is less than the width of a second control unit. Opening the clamps (the spring 15 is then "in resistance") can be forced such that the second control unit can be introduced in between them. Due to the spring 15, the clamps 13 and 14 are then going to exert pressure on the second control unit engaged between them. This pressure is such that said second control unit remains in place when the attachment system is subjected to ball strikes. The clamps 13 and 14 and the spring 15 are arranged on a support 16, the rounded shape of which allows them to stick to the spherical surface of the ball 2.

The device according to the invention therefore utilises joysticks constituted by a couple of control units of first control unit and second control unit type originally for playing football video games in a logic system of augmented reality. An advantage of the device according to the invention is that by original use of the control units of first control unit and second control unit type, it simulates kicking a ball to generate football game signals, which increases the sensations of the virtual game. Another advantage of the device according to the invention is that it contains no complex electronic part, resulting in minimal production costs.

The invention is described hereinabove by way of example. It is understood that the expert is capable of performing different variants of the invention without as such departing from the scope of the patent.

The invention claimed is:

1. A device for the virtual and interactive practice of soccer video games, complementary to game joysticks including control units such that a first control unit comprises transmission unit and motion sensors and that a second control unit comprises motion sensors and a cord connecting it to the first control unit, the device comprising:

a ball elastically connected to a plinth;

an attachment system, integral with the ball and bearing one of said control units;

a connecting system interconnecting said control units over a length greater than that of their connection cord; and a mat attached to said plinth, such that the signals of the motion sensors of at least one of the first and second control units carried by the ball trigger the actions of shots and passes in the game and evaluate the intensity thereof.

2. The device as claimed in claim 1, wherein the attachment system is placed inside the ball.

3. The device as claimed in claim 2, wherein the attachment system includes clamps and kept closed by a closing spring such as one of the control units is held in place when clamped between the clamps.

4. The device as claimed in claim 2, wherein the attachment system includes a sheath adapted to the dimensions of one of the control units.

5. The device as claimed in claim 2, wherein the attachment system includes a casing which can house one of the control units and leaving an opening to the connecting system.

6. The device as claimed in claim 2, wherein the attachment system includes an imprint in the ball of the form of one of the control units.

7. The device as claimed in claim 1, wherein the attachment system is stuck or thermo-welded to the surface of the ball at a place where the control unit placed there cannot be crushed or struck by the actions of pressure on the ball or of strike in the ball of the user.

8. The device as claimed in claim 1, wherein the connecting system detaches the movements of the two control units in that it comprises an outlet in which the connector located at the end of the connection cord originating from the second control unit is connected, outlet connected to a cable whereof the end is constituted by a connector connecting to the outlet of the first control unit.

* * * * *